US005816288A

United States Patent [19]

Zelch

[11] Patent Number: 5,816,288

[45] Date of Patent: Oct. 6, 1998

[54] INSECT AND FROST PROOF VENT FOR WATER STORAGE TANKS

[76] Inventor: Clyde H. Zelch, P.O. Box 525, Owensville, Mo. 65066

[21] Appl. No.: 853,457

[22] Filed: May 9, 1997

[51] Int. Cl.[6] .................................................... F16K 24/00

[52] U.S. Cl. ......................... 137/587; 137/377; 454/368; 454/35; 55/385.4; 55/498; 55/487

[58] Field of Search .................................... 137/587, 589, 137/377, 545, 549, 526; 454/368, 35, 38; 55/385.4, 385.7, 330, 498, 487, 482, 323, 324, 483, 484, 341.4, 341.7, 342, 488, 489

[56] References Cited

U.S. PATENT DOCUMENTS

| | | | |
|---|---|---|---|
| 687,907 | 12/1901 | Sterby | 454/35 |
| 2,421,705 | 6/1947 | Kasten | 55/498 |
| 2,437,489 | 3/1948 | Vokes | 55/498 |
| 3,084,704 | 4/1963 | Marx | 55/385.4 |
| 3,488,928 | 1/1970 | Tarala | 55/498 |
| 3,494,114 | 2/1970 | Nelson et al. | 55/498 |
| 3,710,562 | 1/1973 | McKenzie | 55/487 |
| 4,268,289 | 5/1981 | Polaner | 55/498 |
| 4,349,009 | 9/1982 | Patterson et al. | 454/35 |
| 4,535,807 | 8/1985 | Ericson | 137/526 |
| 4,541,544 | 9/1985 | Martin, Jr. et al. . | |
| 4,593,504 | 6/1986 | Bonnici et al. | 454/368 |
| 4,693,393 | 9/1987 | DeMinco et al. . | |
| 4,706,840 | 11/1987 | Thompson . | |
| 4,995,308 | 2/1991 | Waggoner . | |
| 5,058,621 | 10/1991 | Thumm . | |

FOREIGN PATENT DOCUMENTS

| | | | |
|---|---|---|---|
| 1454543 | 11/1976 | Netherlands | 55/498 |

*Primary Examiner*—Denise L. Ferensic
*Assistant Examiner*—John Ball
*Attorney, Agent, or Firm*—Patent & Trademark Services Inc.; Thomas Zack; Joseph H. McGlynn

[57] ABSTRACT

A protective vent for a water storage tank having an inner flexible fine mesh screen and an outer heavier more rigid screen with a wider mesh. Both screens are mounted on a frame structure under an extending upper protective cover. Air from the water tank can communicate with ambient air after passing through the two screens. The outer screen acts to protect the tank and the inner screen from birds, grasshoppers and large insects while the flexible wrinkled inner screen protects against frost and smaller insects entering the tank. Fiberglass may be used for the fine inner screen and galvanized hardware cloth for the outer screen. The vent is constructed to be mounted over an existing vent stack from the storage tank. On those water storage tanks whose venting capacity is no longer adequate and an increase in air flow is desired, a new larger diameter vent stack can be installed in place of the existing smaller stack with this protective vent system.

7 Claims, 4 Drawing Sheets

INSECT AND FROST PROOF VENT FOR WATER STORAGE TANKS

BACKGROUND OF THE INVENTION

Storage tanks with drinking water can present a health problem when insects get into the stored water or when frosting over of vent screens apply pressures that could damage the tank's physical structure. One of the tank components where insects and frosting over of protective screens may occur is their overhead air vent. Typically, one or more of such vents are located on the tank's roof each with an upper enlarged cover having a gradually sloping top to drain water away from its higher center. Such covers are usually supported by spaced support elements which allow air to enter into and from the opened vent top. A mesh screen attached to the support elements may be used to prevent the entrance of insects into the vented top and its lower storage tank.

When in place these covers and screens have been somewhat effective in preventing airborne dust and pollutants, freezing rain and insects, such as flies and other large bugs, from entering into the vent and its water storage tank. Temperature variations, especially low temperatures below freezing, can cause the screens to frost over and become damaged thus allowing an entrance to the storage tank for insects and other undesired elements. This may put the storage tank in violation of State health and drinking water standards. The present invention seeks to overcome these problems by providing for an inner and outer screened air venting system where the inner screen is made of a flexible fine mesh material while the outer more rigid screen acts to protect the inner screen as detailed herein.

DESCRIPTION OF THE PRIOR ART

Vents for storage tanks have a variety of different functions, parts and configurations. For example, in U.S. Pat. No. 4,541,544 to Martin, Jr. et al. the cover has a venting closure beneath it which can be pushed upwardly by a surge of milk in the tank to close a vent opening in the outside cover to prevent milk from escaping. In U.S. Pat. No. 4,693,393 to DeMinco et al. a fuel vapor storage canister has inner and outer covers through which the purge air flow is directed. The Thompson invention disclosed in U.S. Pat. No. 4,706,840 is a baffled tank vent having an outer vent cap against a boat's hull. And in U.S. Pat. No. 5,058,621 to Thumm the disclosed tank breather whose air flow path operates by liquid level variations of contained liquids. The present invention's vent system provides for the protection of stored water by utilizing an inner flexible screen and an outer rigid screen both of which are mounted under a protective cover as further set forth in this specification.

SUMMARY OF THE INVENTION

This invention relates to a protective vent for a water storage tank having an inner flexible screen and an outer heavier more rigid screen both of which are mounted under an extending upper protective cover.

It is the primary object of the present invention to provide for an improved protected storage tank vent.

Another object is to provide for such a vent having an inner flexible screen and an outer more substantial screen under a common protective cover.

These and other objects and advantages of the present invention will become apparent to readers from a consideration of the ensuing description and the accompanying drawings.

DESCRIPTION OF THE PREFERRED EMBODIMENT

Figure 1:
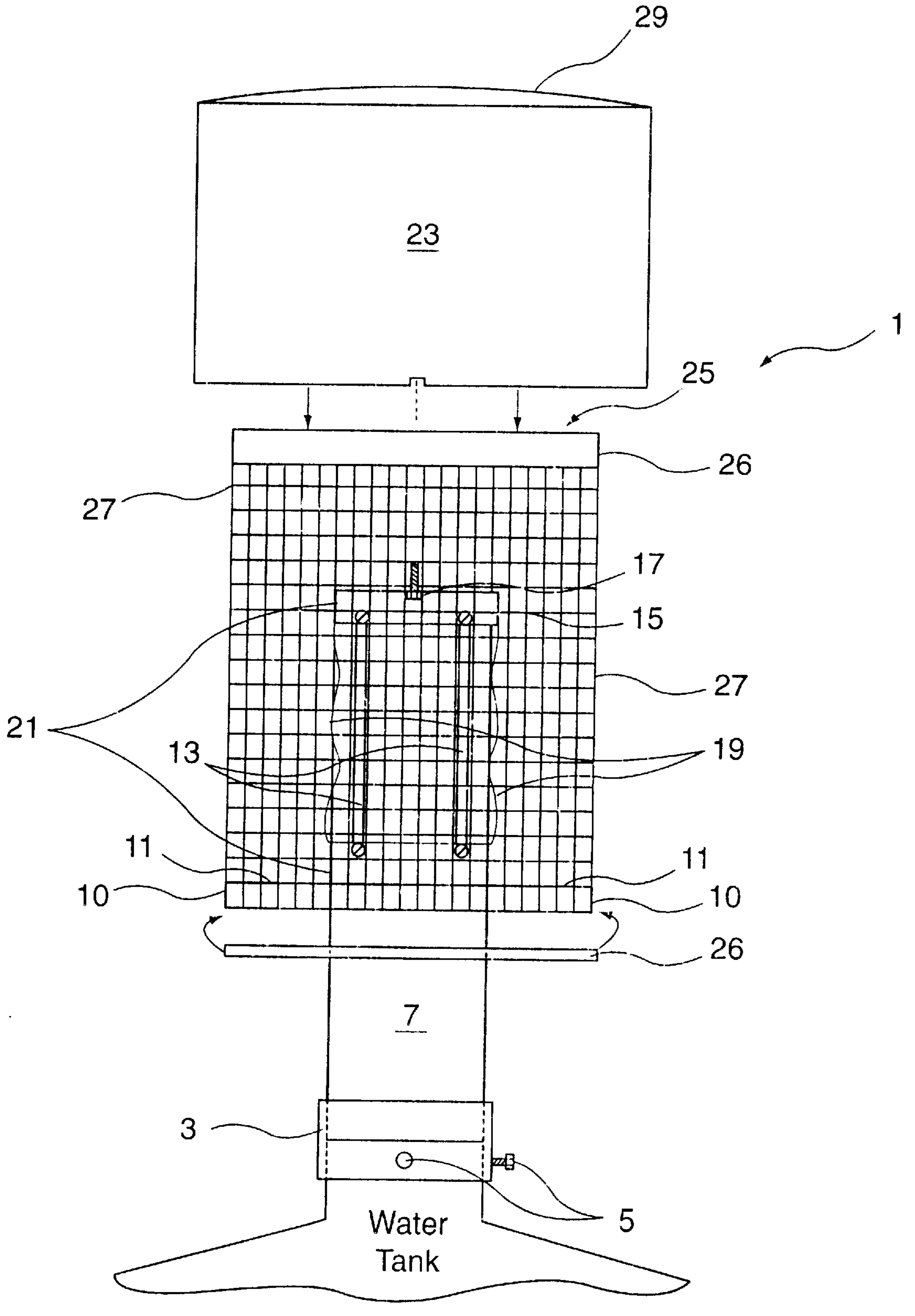
FIG. 1 is an exploded front view of the major components of the invention's preferred embodiment.

FIG. 1 is an exploded front view of the major components of the invention's preferred vent embodiment 1. The invention is constructed to fit over the round exhaust vent stack or pipe of an existing air vent on a storage tank's roof after the vent's protective cover has been removed. On those water storage tanks whose venting capacity is no longer adequate and an increase in air flow is desired, a new larger diameter vent stack can be installed in place of the existing smaller stack with this protective vent system. This vent system was specifically developed to respond to the insect and frost problems associated with water storage tanks. In the shown embodiment the cylindrical hollow lower sleeve 3 is constructed to fit over an existing similar shaped vent stack without its cover.

Three or more threaded bolts 5 equally spaced around the lower circumference of sleeve 3 and extending through it permit the sleeve's attachment to the existing exposed cylindrical vent stack. Above the sleeve 3 is a slightly reduced diameter hollow center sleeve section 7 which is molded into the lower sleeve 3 and opened to ambient air at its top. A vertical flat circular outer edge 10 and a flat horizontal upper circular base member 11 are joined together and welded to section 7.

Extending upwardly from the top of section 7 are two or more (two shown in FIG. 1) equally spaced elongated flat support bar elements 13 having sufficient spacing between them to permit air to freely circulate. The flat support bar elements 13 are welded at their lower end to the sleeve section 7 around its hollow opened top. At their upper ends elements 13 are each welded to an an equal diameter cap pipe section 15. Pipe section 15 is closed and approximately the same outer diameter as the opened sleeve section 7. An upwardly facing bolt 17 welded into through the center surface of cap top 15 has its threads exposed.

Extending completely around the flat support elements 13 is an inner fine mesh fiberglass screen 19. This inner screen is attached at its top and bottom ends, respectively, by stainless steel ring bands 21 to section 15 and the upper part of section 7 above base member 11. The particular fine mesh material used to construct the inner screen 19 has little or no structural strength and was selected because it can form a fine mesh flexible wrinkled surface which will flex to provide frost protection and protection from small insect entering into the air of the lower stored tank water.

Above pipe cap section 15 is the enlarged center hole cover 25 which extends over and around the bolt 17. Cover 25 is held to this cap section by center bolt 17. Two separate stainless steel band ring clamps 26 are used to mount an outer galvanized hardware cloth No. 4 screen 27 around the section with cover 25, one at its top and another on the vertical edge of depending skirt 10 at its bottom side. Outer screen 27 concentrically forms what resembles a screen surfaced cylinder which is larger in diameter and extends completely around the inner smaller screen cylinder formed by finer mesh flexible screen 19. This larger screen cylinder extends around all of the inner screen's sides exposed to ambient air.

The material used to construct outer screen 27 is substantially more rigid, stronger and heavier than the flexible fine fiberglass mesh used to construct the inner screen 19. Outer screen 27 thus forms a protective barrier for the inner screen from grasshoppers, birds and large bugs and the water supply located below. Located above both screens is the protective solid extending larger circular top cover 23 which extends down on its sides to protect the screen from freezing rain and the contents of the below storage tank from cross winds carrying dust and other airborne pollutants.

Cover 23 is a solid surface that its opened at the bottom. The cover is slightly dome shaped on its top surface such that its center is higher than its edges to allow deposited moisture, snow or other material to fall down its sides away from the vent structure below and not enter through the dual screens to the tank. A disk 29 with the necessary sloped configuration may be welded to the cover's top insuring this desired result.

Figure 2:
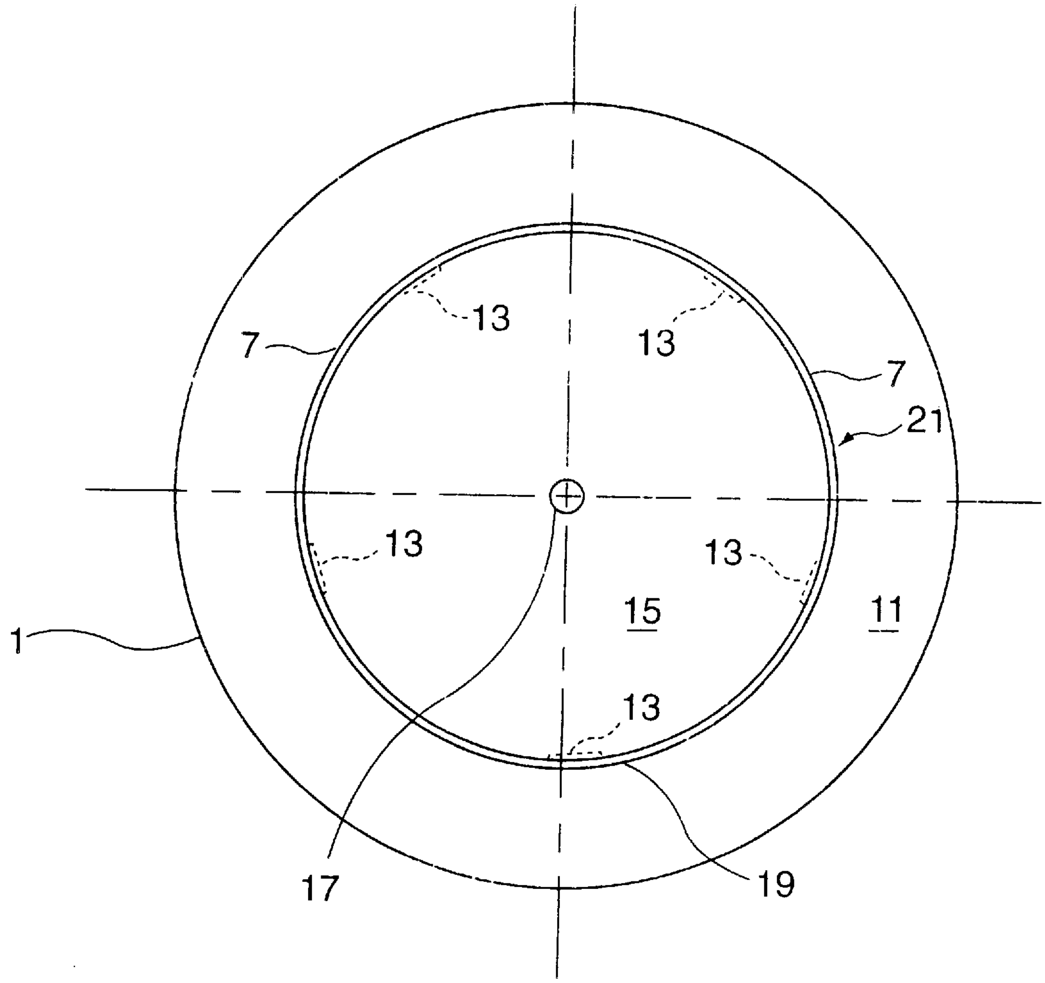
FIG. 2 is a top view of the assembled FIG. 1 embodiment with its outer screen and covers removed.

FIG. 2 is a top view of the assembled FIG. 1 embodiment with its outer screen 27 and covers 23 and 25 removed looking downwardly in the direction of the FIG. 1 arrows. Part of the upright center bolt 17 welded to the top of section 15 is depicted along with the larger diameter base member platform 11 below it. The outer screen is clamped to this platform's vertical edged depending skirt 10 which extends around the platform's circumference. The equally spaced flat support bars 13 extending up from below base pipe section 7 have their upper ends shown in dotted line format inside the encircling steel ring 15.

Figure 3:
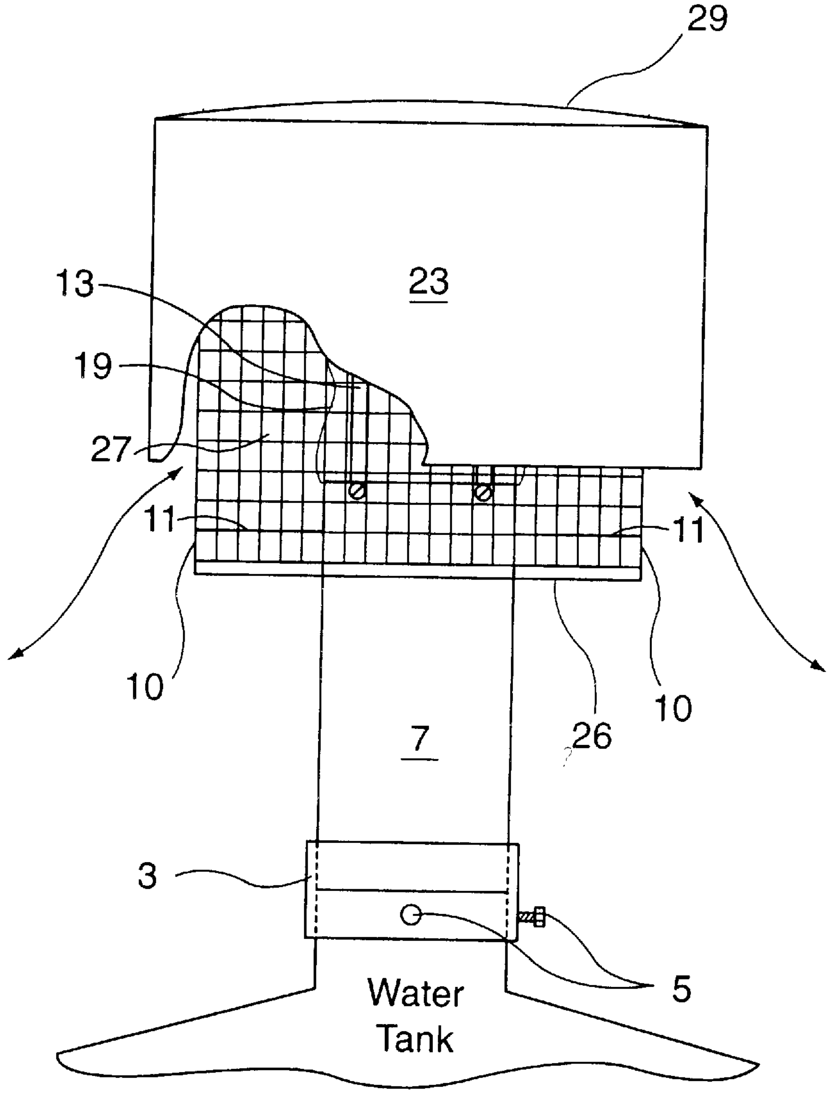
FIG. 3 is a front view of the assembled FIG. 1 embodiment with a cover section cut away.

FIG. 3 is a front view of the assembled FIG. 1 embodiment with part of the cover section 23 cut away. The cover's 23 cut away section reveals the outer screen 27 held at its bottom to vertical edge 10 by the lower encircling ring clamp 26. Visible in this cut away section behind screen 27 are the inner screen 19 and one of the support bar elements 13. The arrows on both sides indicate the approximate contemplated air flow to and from the water tank under the lower opened edge of cover 23 after passing through the concentrically mounted screens and section 7.

Figure 4:
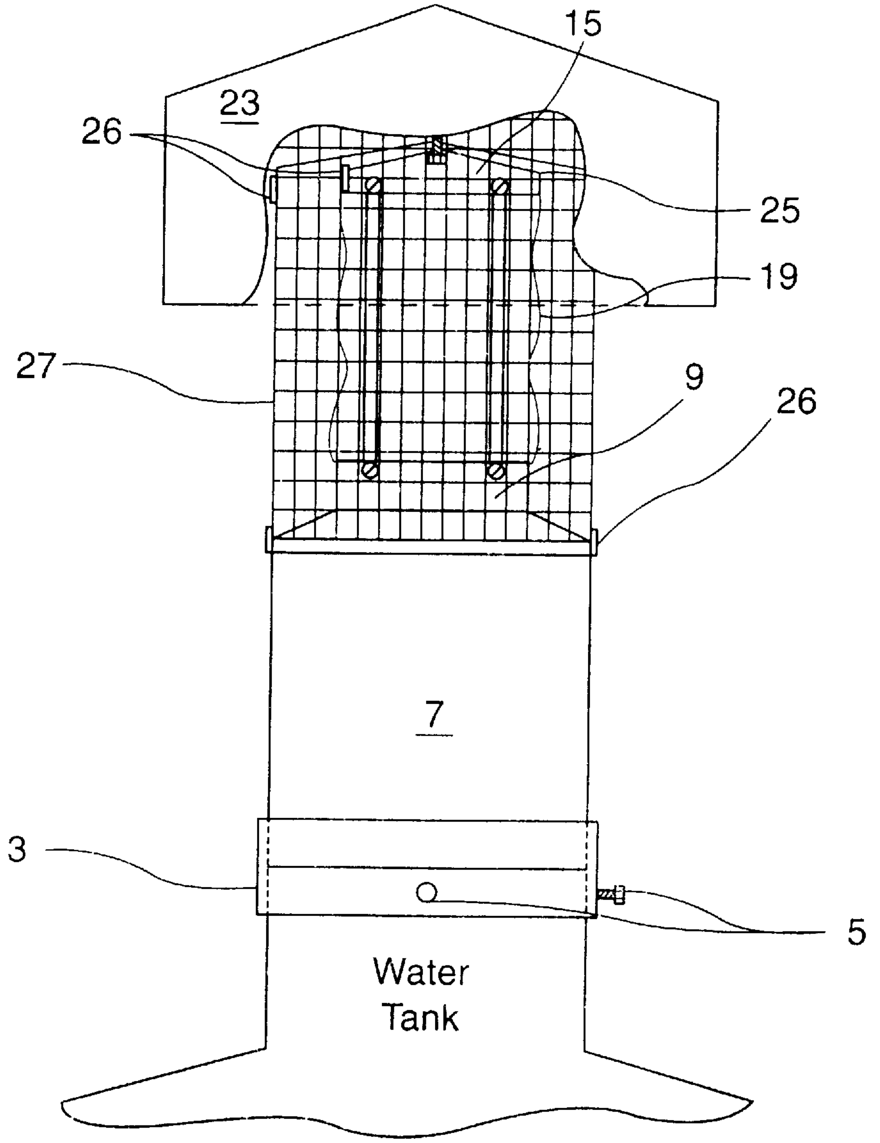
FIG. 4 is a front view of a modified FIG. 1 embodiment with its cover section cut away.

In the described FIGS. 1–3 embodiment the existing vent stack 7 and the mounted pipe cap section 15 are configured to have substantially the same outer diameter. These same diameters generally go from 2 to 10 inches. As the existing vent systems increase in diameter up to about 26 inches, a variation to the described embodiment can be made. This variation is depicted in FIG. 4 wherein cover section 23 is partially cut away and the described parts have the same designation as in the FIGS. 1–3 embodiment but vent stack 7 and center hole cover 25 have the same diameter while mounted pipe cap section 15 and depicted lower skirt 9 have a smaller diameter. Band clamps 26 with the appropriate diameters mounted the inner screen 19 to pipe cap section 15 and depicted lower skirt 9 at their top and bottom, respectively. Larger diameter band clamps 26 mount the larger outer screen 27 to the outside diameter of lower vent stack 7 and upper center hole cover 25.

The particular material used to construct embodiments of the invention and the specific dimensions for the components can vary provided they are in accordance with the described operation. Since it is intended they be exposed to the elements, all should be constructed of material that is moisture resistant or waterproof. While carbon steel has been used for the frame support and its sleeve, cap and cover components, conceivably weather resistant molded plastics, stainless steel, aluminum and other suitable materials could also be used to construct these components.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. The combination of a water storage tank and a protective vent comprising:

a water storage tank having water therein and an upper opening;

a support frame structure mounted on said tank's upper opening such that the frame is in gaseous communication with the water in said lower water storage tank;

a screen system mounted on said support frame and limited to an inner screen and an outer screen, said inner screen being a flexible fine mesh screen adapted to permit the passage of gas there through to the surrounding ambient air and water in the lower water storage tank;

said outer screen having a larger screen mesh size than the screen mesh of said inner screen and said outer screen being made of a more rigid material than the material of said inner screen; and an upper protective cover mounted on said support frame and extending over said inner and outer screens to provide a protective upper cover thereto.

2. The combination of a water storage tank and a protective vent as claimed in claim 1, wherein said inner and outer screens are each shaped to resemble vertically disposed cylinders generally concentrically disposed with respect to each other.

3. The combination of a water storage tank and a protective vent as claimed in claim 2, wherein said support frame consists of a lower hollow sleeve section with a plurality of spaced support elements extending upwardly therefrom, said hollow sleeve being in gaseous communication with the water storage tank through the sleeve's hollow part.

4. The combination of a water storage tank and a protective vent as claimed in claim 3, wherein said support frame has an upper cap section mounted on the upper ends of said spaced support elements with said protective cover mounted on said upper cap section.

5. The combination of a water storage tank and a protective vent as claimed in claim 4, wherein said support frame includes a base structure mounted to the lower hollow sleeve and extending outwardly therefrom and including means for attaching the outer screen to said support frame base under said upper protective cover.

6. The combination of a water storage tank and a protective vent as claimed in claim 5, including means for mounting the inner screen to the top portion of said hollow sleeve section and said upper cap section extending around said spaced support elements.

7. The combination of a water storage tank and a protective vent as claimed in claim 6, wherein said inner screen is made of a fine mesh fiberglass material and said outer screen of a galvanized rigid hardware cloth material.

* * * * *